United States Patent [19]

Mizuhara

[11] Patent Number: 4,853,291
[45] Date of Patent: Aug. 1, 1989

[54] GOLD-PALLADIUM-NICKEL-COPPER-MANGANESE FILLER METAL FOR JOINING SUPERALLOY

[75] Inventor: Howard Mizuhara, Hillsborough, Calif.

[73] Assignee: GTE Products Corporation, Stamford, Conn.

[21] Appl. No.: 262,384

[22] Filed: Oct. 26, 1988

Related U.S. Application Data

[62] Division of Ser. No. 174,278, Mar. 28, 1988.

[51] Int. Cl.⁴ ................................................ C22C 1/09
[52] U.S. Cl. .................................... 428/593; 428/671; 428/675; 428/678
[58] Field of Search ................ 428/593, 675, 678, 671

[56] References Cited

U.S. PATENT DOCUMENTS

| | | | |
|---|---|---|---|
| 388,145 | 8/1888 | Heinrich et al. | 420/587 |
| 3,072,225 | 1/1963 | Cremer et al. | 428/593 |
| 3,084,770 | 4/1963 | Wirsing, Jr. | 428/593 |
| 4,527,998 | 7/1985 | Kwemeyer | 420/587 |
| 4,576,790 | 3/1986 | Rothaut et al. | 420/587 |

*Primary Examiner*—L. Dewayne Rutledge
*Assistant Examiner*—David Schumaker
*Attorney, Agent, or Firm*—James Theodosopoulos

[57] ABSTRACT

A filler metal for brazing parts made of superalloys has a brazing temperature of 1025°–1080° C., a solidus temperature above 1000° C., a liquidus temperature above 1018° C. and a composition of, in weight percent, 5–30 gold, 15–35 palladium, 10–30 nickel, 20–48 copper, 5–25 manganese.

1 Claim, No Drawings

GOLD-PALLADIUM-NICKEL-COPPER-MANGANESE FILLER METAL FOR JOINING SUPERALLOY

This application is a division of application Ser. No. 174,278 filed 3/28/88.

This invention is concerned with the joining of superalloy metals, such as Inconel 718, which are solution heat treated followed by a precipitation heat treatment to yield optimum room temperature yield strength. This invention discloses a brazing alloy that brazes at the solution heat treating temperature. The alloy has good gap filling properties and good high temperature properties.

A brazing alloy in accordance with this invention has the following composition, in weight percent: 5-30 gold; 15-35 palladium; 10-30 nickel; 20-48 copper; 5-25 manganese. It has a solidus temperature above about 1000° C. and a liquidus temperature above about 1018° C.

U.S. Pat. No. 4,527,998 discloses a brazing alloy having a composition, in weight percent, of 18-39.5 gold, 2.5-10.5 palladium, 3.5-14.5 nickel, 7.5-9 manganese, balance copper, and which is used for brazing carbides. However, the alloys disclosed therein would flow too much at a desired heat treatment temperature of 1025° to 1080° C. to form a suitable fillet at the braze joint of superalloys in foil or sheet form.

A brazing alloy as per this invention could be used in the manufacture of superalloy face panels consisting of, for example, two sheets of metal brazed to a honeycomb structure of thin superalloy metal sandwiched therebetween. Such panels could be constructed as follows. A 4' by 8' sheet of 10-30 mil thick Inconel 718 is placed on a suitable horizontal support. Next, a 4'×8' sheet of 1-2 mil thick foil of brazing alloy as per this invention is placed on the Inconel sheet. Then, a 4' ×8' honeycomb structure, ½" high, made of 2 mil thick Inconel 718 is placed on the foil. The sandwich is completed by placing another foil, same size, on the upper side of the honeycomb structure and another Inconel sheet, same size, on the foil. The assembly is brazed in a vacuum at 1080° C. for 10-30 minutes. At this temperature, the upper brazing alloy does not run down; it forms a suitable fillet to join the honeycomb to the upper Inconel sheet.

Following are examples of alloys that were evaluated.

EXAMPLE 1

An alloy consisting of 25% Au, 15% Pd, 18% Ni, 31% Cu, 11% Mn is alloyed in an alumina crucible under $10^{-5}$ Torr vacuum, and cast into a ⅜" thickness×3" wide by 6" long cavity size copper mold. The ingot was reduced to 3 mil foil with intermediate anneal. The DTA trace showed the melting temperatures to be 1052° C. liquidus and 1017° C. solidus. A "T" joint was prepared from 30 mil thickness Inconel 718 that was pretreated with nitric acid-hydrofluoric acid-water solution. The "T" joint was brazed with seam in a perpendicular position to the furnace hearth. An alloy was placed between the base of the "T" and the base plate and brazed at 1070° C. under $10^{-5}$ Torr vacuum.

The alloy flowed uniformly forming uniform fillet along the seam. The joint was tough and when exposed to 700° C. for 48 hours showed discoloration, but no spalling of the surface oxide.

EXAMPLE 2

Using the same process as Example 1, a "T" constructed from 30 mil thickness Inconel 625 was brazed with similar result as above using an alloy of 5% Au, 30% Pd, 10% Ni, 40% Cu, 15% Mn and brazing at 1070° C. An excellent braze with uniform fillet formed along the "T" joint.

EXAMPLE 3

Same as Example 2 using an alloy of 15% Au, 20% Pd, 13% Ni, 41% Cu, 11% Mn. An excellent braze with uniform fillet was formed.

Table 1 shows the composition of alloys within this invention on which liquidus and solidus temperature were determined.

TABLE 1

| Alloy No. | Au % | Pd % | Ni % | Cu % | Mn % | Liq./Sol °C. |
|---|---|---|---|---|---|---|
| 75-11 | 5 | 15 | 22 | 38 | 20 | 1018/1005 |
| -191 | 5 | 25 | 10 | 45 | 15 | 1035/1000 |
| -20 | 5 | 30 | 12 | 40 | 13 | 1065/1040 |
| -21 | 5 | 30 | 10 | 40 | 15 | 1050/1030 |
| -34 | 5 | 20 | 15 | 48 | 12 | 1070/1035 |
| 96-131 | 15 | 15 | 15 | 42 | 13 | 1032/1000 |
| -14 | 15 | 20 | 13 | 41 | 11 | 1043/1010 |
| -15 | 20 | 25 | 10 | 35 | 10 | 1045/1015 |
| -17 | 15.5 | 24 | 20 | 31.5 | 9 | 1080/1053 |
| 97-5 | 25 | 15 | 20 | 31 | 9 | 1080/1020 |
| -61 | 25 | 15 | 18 | 31 | 11 | 1052/1017 |
| -121 | 20 | 15 | 18 | 36 | 11 | 1065/1025 |

I claim:

1. A panel comprising a honeycomb structure of thin superalloy metal sandwiched between and brazed to two sheets of superalloy metal, the braze consisting of an alloy of, in weight percent, 5-30 Au, 15-35 Pd, 10-30 Ni, 20-48 Cu, 5-25 Mn, the brazing alloy having a solidus temperature above 1000° C. and a liquidus temperature above 1018° C.

* * * * *